United States Patent Office 2,888,640
Patented May 26, 1959

2,888,640

CONDUCTIVITY CELLS

Edgar L. Eckfeldt, Ambler, and Eugene R. Kuczynski, Philadelphia, Pa., assignors to Leeds and Northrup Company, Philadelphia, Pa., a corporation of Pennsylvania Application March 2, 1956, Serial No. 569,066

9 Claims. (Cl. 324—30)

This invention relates to conductivity cells and has for an object the provision of structure for making the cells reliable in operation and by means of which there may be obtained reproducible determination of the conductivity of liquids of widely different character.

Conductivity cells have long been in use and provide valuable information with respect to liquids in terms of the conductivity of such liquids. To obtain maximum benefit and information from such measurements it is important that the conductivity cell shall have a cell-constant within the range needed for a particular solution and that the measurements shall not only be accurate but reproducible. Chemical attack, corrosion, and similar factors must be guarded against if reproducible measurements are to be obtained, particularly with cells which have been in use for a period of time.

In accordance with the present invention, conductivity cells are provided which are of rugged mechanical construction and yet which provide at relatively low cost long life and continued reproducibility in conductivity measurements. In carrying out the invention in one form thereof the conductivity cell is characterized by a molded body having a passage extending transversely thereof. A pair of conductors are imbedded in the body and extend around the passage. On opposite sides of the passage the conductors extend lengthwise of the molded body but at one end thereof the conductors protrude outwardly therefrom to form connecting means for the measuring circuit of the cell. The conductors terminate at their opposite ends at electrodes disposed midway of the molded body and in the region of fluid passages which communicate one with the other through the transverse passage. These fluid passages provide not only a reproducible configuration of solution between the electrodes respectively imbedded in the molded body with a surface area exposed to the liquid in the passage but also provide for circulation of the solution through the passages. Each conductor is electrically connected to one of the electrodes in a region removed from contact by liquid within the passages, that region being within the molded body itself.

For further objects and advantages thereof and for more detailed information on the technique of making conductivity cells in accordance with the present invention, reference is to be had to the following detailed description taken in conjunction with the accompanying drawings, in which.

Figure 1:
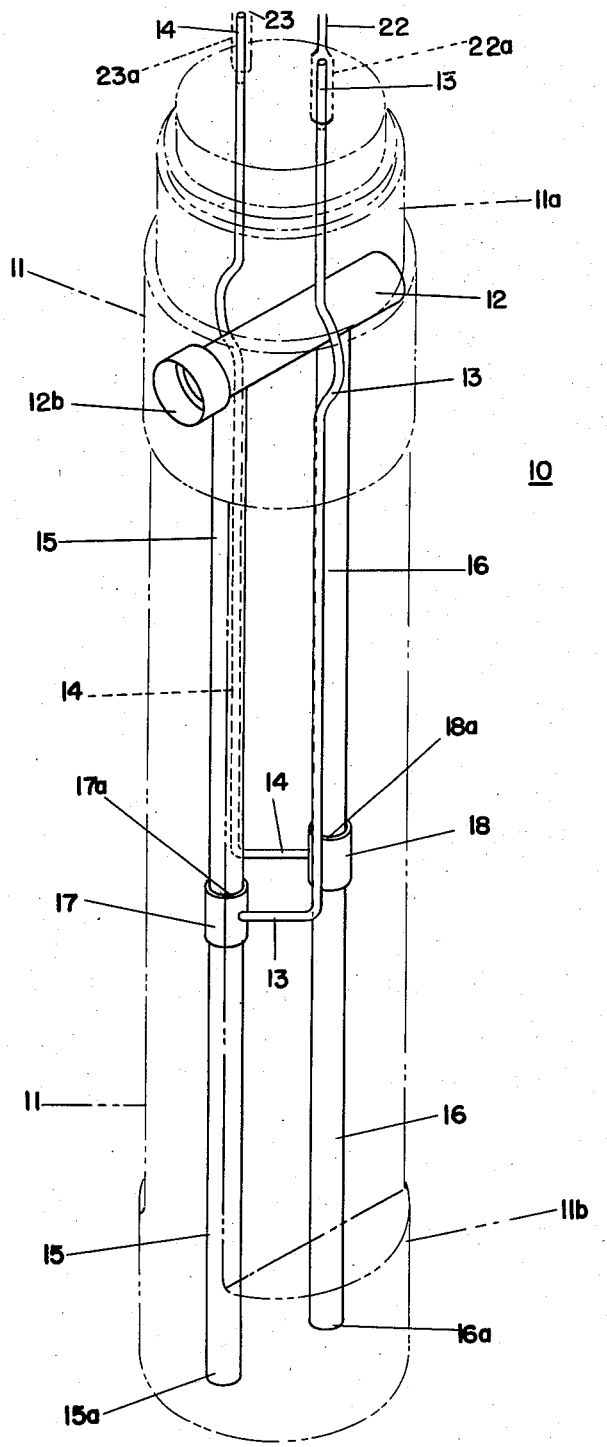
Fig. 1 is a perspective view of a conductivity cell embodying the invention with the molded body illustrated in phantom.

Referring to Fig. 1, a conductivity cell 10 comprises a molded body 11 having a transverse passage 12 extending through the upper end thereof. A pair of electrical conductors 13 and 14 protrude outwardly above the upper end of the body 11 and comprise pin-like connectors for the measuring circuit to be used in conjunction with the cell 10. The conductors 13 and 14 in the region of the transverse passage 12 are bent outwardly and around that passage and thence extend downwardly of the body 11 terminating at a region midway thereof.

Fluid passages 15 and 16 are in communication one with the other within the transverse passage 12 and extend from that passage to the distal end of the body 11. Midway of the fluid passages are cylindrical conductors 17 and 18 imbedded within the body with only the inner surfaces 17a and 18a exposed. The exposed surfaces provide electrodes of predetermined area for contact with liquid within the passages 15 and 16. The conductors 13 and 14 in the regions adjacent said electrodes 17 and 18 are electrically secured thereto as by brazing, soldering, or the like.

With a conductivity cell constructed as described, it will be seen that the upper end of the body 11 having a threaded end-portion 11a of reduced diameter may be readily attached to a manipulating means and bodily immersed in a liquid or solution whose conductivity is to be measured. Upon immersion of the cell 10 to a depth adequate to cover the transverse passage 12, the liquid or solution will fill the longitudinal passages 15 and 16 as well as the transverse passage 12 and thus there will be established a configuration of solution between the electrodes 17 and 18 which extends the full length of passages 15 and 16 and between the passages 15 and 16. The electrodes 17 and 18 will preferably be of a conductive material, such as platinum, carbon, or graphite, selected because of inertness with respect to the solution under measurement and suited to the electrochemical properties needed for the conductivity measurements. When the electrodes 17 and 18 are of platinum, and coated with platinum black to improve their chemical performance, considerable saving is realized by making the conductors 13 and 14 of copper, or the like. A lower cost conductor, such as copper, can be used since it is in its entirety imbedded in the molded body 11 and thus protected from the liquid under measurement.

Figure 2:
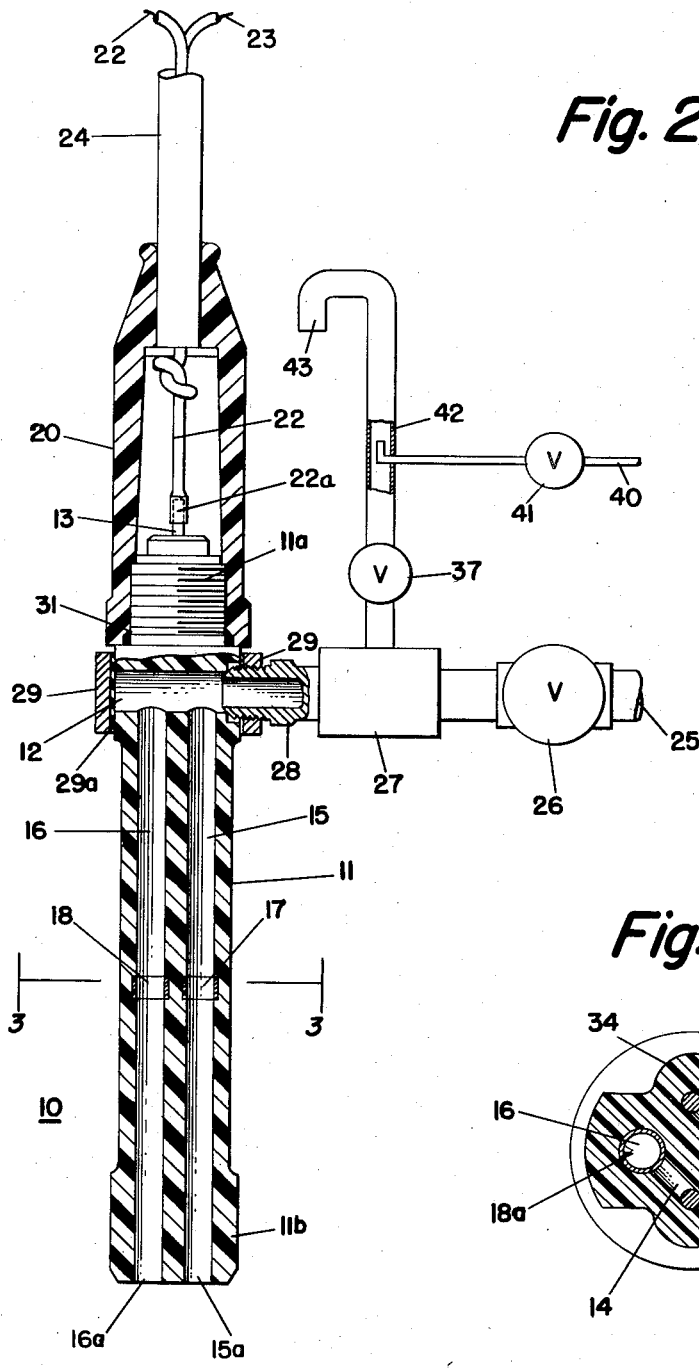
Fig. 2 is a sectional view of a cell embodying the invention and in part diagrammatically illustrates several different ways of using the cell.

Referring now to Fig. 2, the conductivity cell 10 has attached to the threaded end 11a thereof a handle 20, of the same material as the molded body 11, by means of which the cell 10 may be immersed within and withdrawn from solutions under measurement. The handle 20 likewise forms a fluid-tight protecting enclosure for the conductors 13 and 14 and the lead wires 22 and 23 forming a part of the measuring circuit associated with the connector cable 24. The lead wires 22 and 23, Fig. 1, at their lower ends terminate in clips 22a and 23a which slidably engage the protruding ends of conductors 13 and 14.

The cell 10 may be used not only as an immersion unit, but it also lends itself to other applications where the passages 15 and 16 form flow channels for traverse of the solution under measurement as between the inlet ends 15a and 16a and the transverse passage 12. The fluid flow may be in either direction. For example, it may be by way of an inlet connection or pipe 25, Fig. 2, a valve 26, a T-connection 27 and a nipple 28, the inner end of which forms a fluid-tight connection with the body of the cell 10. The nipple 28 is threaded into a ring 29 encircling the cylindrical upper end of the cell 10. The ring closes one end of the transverse passage 12. In some cases it may be desirable to include between the ring and the cylindrical surface a gasket 29a to insure a liquid-tight seal of one end of the passage 12. The flow divides in transverse channel 12 between the two flow channels 15 and 16 with exit at the ends 15a and 16a of said channels. The lower end of body 11b is cylindrical and is threaded to receive a threaded end of a pipe or coupling member for continued flow of the liquid sample from the cell 10.

The body of the cell is made of a plastic material not only inert to the solution under measurement, but also having a high degree of dimensional stability. The plastic is preferably one which can be molded, and in a preferred form of the invention comprises the plastic material available on the market under the trademark "Kel-F," which is a fluorocarbon resin, a polymer of trifluorochloroethylene and also known as polychlorotrifluoroethylene.

With an arrangement such as shown in Fig. 2, the nipple 28 with the end thereof projecting into the counterbored portion of the transverse passage 12b, Fig. 1, can be utilized to insure that the handle 20 is tightly screwed to the threaded end 11a and against a sealing ring 31. The transverse passage 12 can be utilized for the same purpose by inserting therein a rod to tighten the threaded connection between the end 11a and the handle 20.

Figure 3:
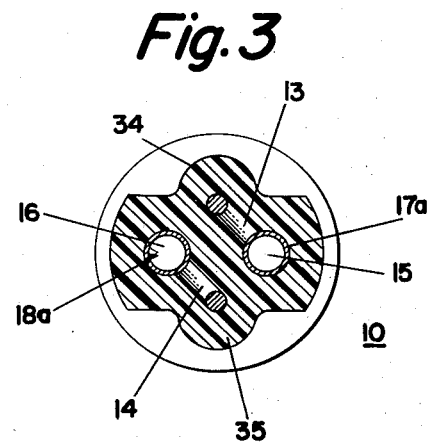
Fig. 3 is a sectional view taken on the line 3—3 of Fig. 2.

By arranging the conductors 13 and 14, Fig. 3, to extend longitudinally of the cell 10 in a plane at right angles to the plane containing the flow channels 15 and 16, there is achieved between the conductors and the flow channels and the surface of the cell adequate wall thickness to provide substantial strength to the body. Moreover, by increasing the cross-sectional area by providing protuberances 34 and 35, additional strength is imparted to the body, and in this connection it is to be noted that the conductors themselves molded into the body are of fairly large cross-sectional area to provide low resistance paths. They also add strength as reinforcing members to the body. It will be further observed that the respective inner ends of conductors 13 and 14, Fig. 1, extend toward the associated electrodes along paths generally parallel to each other and without reduction in wall thickness between the flow passages 15 and 16.

Referring again to Fig. 2, the arrangement lends itself to induced circulation of solution through the passages 12, 15 and 16 in measurement of batch samples. Thus, in the absence of the piping 25 and valve 26, or with valve 26 closed and valve 37 open, the unit may be immersed within the solution. Associated with the connector 27 is an airlift or other device for inducing upward flow of the solution through the measuring passages 15 and 16.

More particularly, air under pressure from any suitable source flows by way of supply line 40, regulating valve 41 and into the pipe 42. The admixture of air into the column of liquid within the pipe 42 reduces its density and produces flow of the solution from inlets 15a and 16a to the outlet 43 of pipe 42. The outlet 43 is below the upper end of the enclosure or handle 20 which for the airlift type of arrangement will be made as long as needed or may be replaced by an enclosing pipe.

Conductivity cells of the type thus far described lend themselves to conductivity measurements with cell-constants variable over a wide range, as for example, from 1 to 100 reciprocal centimeters. With the flow passages 15 and 16 having diameters of approximately 0.21 inch, a cell-constant of 25 reciprocal centimeters will be obtained, with each passage having a length of $4^{17}/_{32}$ inches. An instrument with a cell-constant of 50 reciprocal centimeters is obtained by reducing the diameter of flow passages 15 and 16 to about 0.15 inch. By further variations in diameters and length of the flow passages and without changing the basic design of the cell, other and different cell-constants are readily obtained.

Further in connection with the cell-constant, it is preferred that the electrodes 17 and 18 be located midway of the passages 15 and 16 and in positions such that the electrical resistance from one electrode to the other through a path extending through the open ends of the passages 15 and 16 will be the same as the electrical resistance through a path which extends by way of the transverse passage 12.

Since the body of the cell 10 is molded, it is necessary that some "draft" be provided. Thus the cores utilized for the passages 15 and 16 are made of increasingly, or of somewhat, larger diameter from the region of the electrodes 17 and 18 to the open ends thereof than the section extending from the electrodes to the transverse passage 12. A change in diameter of the cores lengthwise thereof is utilized to provide the draft and in addition a shoulder is provided for the preferred location of each of the electrodes 17 and 18 lengthwise of the channels 15 and 16. Because of the aforesaid changing cross-sectional areas of the flow channels 15 and 16, the electrodes 17 and 18 will be located somewhat nearer the transverse passage 12 than the open ends thereof for substantial equalization of the resistance of the paths extending in opposite directions from electrodes 17 and 18.

What is claimed is:

1. A conductivity cell comprising a molded body having near one end thereof a passage extending transversely thereof, a pair of conductors imbedded in said body, said conductors in the region of said passage extending around and in spaced relation with said transverse passage, said conductors on opposite sides of said passage extending lengthwise of said molded body, corresponding ends of said conductors extending outwardly of said molded body and opposite corresponding ends of said conductors terminating midway of said molded body, said body having therein longitudinal fluid passages communicating one with the other through said transverse passage and extending therefrom lengthwise of said body to the distal end thereof, and electrodes imbedded in said body and respectively having a surface area exposed to liquid within said passages, said electrodes being located intermediate the ends of said longitudinal passages and in position substantially to equalize the resistance as measured from an electrode to one end of its associated passage relative to the resistance measured from said last-named electrode to the opposite end of its associated passage, each of said conductors being electrically connected to one of said electrodes in a region removed from contact by liquid within said passages and within the molded body.

2. The conductivity cell of claim 1 in which there are provided means flow-connected to corresponding ends of said fluid passages by way of said first-named transverse passage for producing parallel flow of liquid through said fluid passages.

3. The conductivity cell of claim 1 in which a pipe is attached to said body to form a flow path into said transverse passage, one end of which passage is closed for flow of liquid through said passages extending lengthwise of said body.

4. The conductivity cell of claim 2 in which there is associated with said pipe an airlift for inducing upward flow of liquid through said passages extending lengthwise of said molded body.

5. The conductivity cell of claim 1 in which said passages extend lengthwise of said body with the axes thereof contained in one plane and said conductors imbedded in said body in positions outwardly spaced from said plane and with their axes disposed in a plane at right angles to the plane containing the axes of said fluid passages.

6. The conductivity cell of claim 4 in which said molded body throughout the length thereof containing said conductors has molded protuberances thereon to increase the strength of the body in the regions containing said conductors.

7. The conductivity cell of claim 4 in which said body has a threaded end spaced from said transverse passage, and a supporting means threaded to said threaded end of said body and forming a fluid-tight enclosure with said body and around conductors extending through the supporting means and into electrical connection with ends of the conductors of the cell.

8. A cell for measuring the electrical conductivity of liquids comprising an elongated plastic body having a threaded portion at one end thereof for securing said cell for immersion in a liquid, a pair of parallel passages extending through a portion of said cell body and opening at the distal end of said cell, a transverse passage through said body adjacent said threaded portion and connecting with the proximal ends of said parallel passages to provide a flow path through each of said passages to permit circulation of said liquid through said parallel passages, said transverse passage during installation serving as a tool-receiving cavity for rotating said cell body, a ring electrode located in the central portion of each said parallel passage and imbedded in said cell body, connecting wires for said electrodes imbedded in said cell body and extending through said cell body around said transverse passage and emerging through the threaded end of said cell whereby said cell and its parallel passages may be immersed in liquid whose conductivity is to be measured while protecting the electrical connections from said liquid, said electrodes being located intermediate the ends of said parallel passages and in position substantially to equalize the resistance as measured from an electrode to one end of its associated passage relative to the resistance measured from said last-named electrode to the opposite end of its associated passage.

9. A conductivity cell comprising an elongated molded body having near one end a passage extending transversely therethrough, said molded body having a pair of longitudinal passages spaced one from the other and in communication at one end with said transverse passage and having the opposite ends open at the end of the molded body remote from said transverse passage, an electrode for each said longitudinal passage imbedded in said molded body with a surface area of each electrode exposed to the liquid within its associated passage, said electrodes being located intermediate the ends of said passages and in position substantially to equalize the resistance as measured from an electrode to one end of its associated passage relative to the resistance measured from said last-named electrode to the opposite end of its associated passage, and an electrical conductor for each said electrode imbedded within said body with one end of each said conductor electrically connected to its associated electrode in a region removed from its associated flow passage and extending therefrom through said molded body and outwardly of the end thereof adjacent said transverse passage, said electrical conductors in the regions of said passage being spaced outward from and in partial encirclement of that passage, the end of said molded body adjacent said transverse passage having connecting means providing for the support of the assembly as a whole from said end.

References Cited in the file of this patent

UNITED STATES PATENTS

| | | |
|---|---|---|
| 1,518,211 | Maue | Dec. 9, 1924 |
| 2,122,363 | Christie | June 28, 1938 |
| 2,709,781 | Douty et al. | May 31, 1955 |